United States Patent

[11] 3,581,939

| [72] | Inventor | Frank L. Meyer |
| | | Houston, Tex. |
| [21] | Appl. No. | 842,937 |
| [22] | Filed | July 18, 1969 |
| [45] | Patented | June 1, 1971 |
| [73] | Assignee | Shell Oil Company |
| | | New York, N.Y. |

[54] METHOD AND APPARATUS FOR STORING A SOLID-LIQUID SLURRY
8 Claims, 1 Drawing Fig.

[52] U.S. Cl. .................................................. 222/1,
222/193, 222/413, 239/142
[51] Int. Cl. ............................................... B67b 7/00
[50] Field of Search .................................... 222/1, 193,
195, 226, 413, 64; 239/142

[56] References Cited
UNITED STATES PATENTS
3,160,321 12/1964 Cochran ...................... 222/64
3,310,237 3/1967 Welch ......................... 239/142X
3,338,472 8/1967 Gardner ....................... 222/195
3,386,660 6/1968 Marriam ........................ 239/142

Primary Examiner—Lloyd L. King
Assistant Examiner—John J. Love
Attorneys—Louis J. Bovasso and J. H. McCarthy ABSTRACT: A method and apparatus for storing a solid-liquid slurry in a stationary tank having agitation means at the bottom of the tank for agitating solid components of the slurry which settle to the bottom thereof. The liquid components of the slurry settle on the top of the solid components and are withdrawn from the tank while a relatively solids-free liquid is introduced into contact with the agitation means so as to fluidize any solid components of the slurry surrounding the agitation means. The agitation means is actuated to agitate the solid components at the bottom of the tank and the slurry is withdrawn while the solid components are in suspension.

PATENTED JUN 1 1971
3,581,939
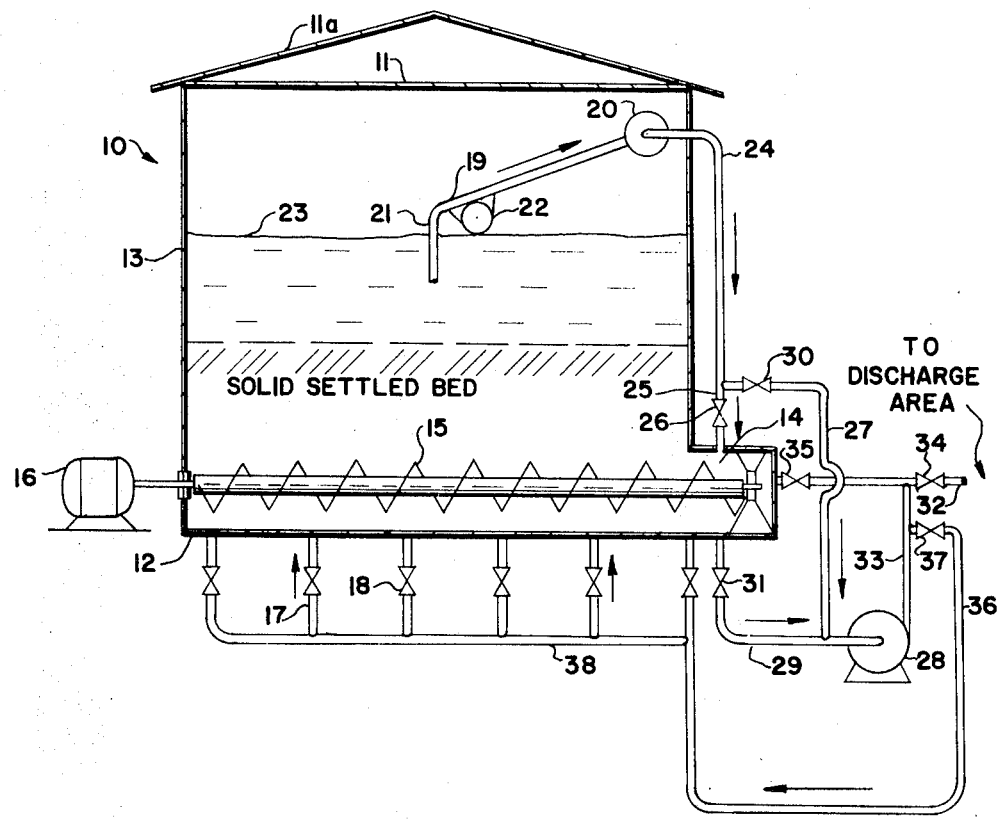
INVENTOR:
FRANK L. MEYER
BY: *Louis J. Bovasso*
HIS ATTORNEY

METHOD AND APPARATUS FOR STORING A SOLID-LIQUID SLURRY

BACKGROUND OF THE INVENTION

1. Field of the Invention

This invention relates to the storage of slurries; and, more particularly, to a method and apparatus for storing a solids-liquid slurry in a stationary tank in such a manner that the slurry may be withdrawn when desired while the solid components thereof are in suspension.

2. Description of the Prior Art

Solid-liquid slurries are normally stored in agitated vessels. Agitation is required to keep the solid particles in the slurry suspended so that the slurry may be withdrawn from the vessel when desired. One substantial disadvantage of this type of slurry storage is that, as the vessel becomes reasonably large, the machinery cost and the power cost to provide adequate agitation becomes enormous. Also, continuous agitation is required to prevent settling which would prevent restarting the agitating mechanism.

SUMMARY OF THE INVENTION

It is an object of this invention to provide a method and apparatus for storing solid-liquid slurries without wasting power necessary to keep the solid components of the slurries suspended during storage.

It is a further object of this invention to provide a method and apparatus for economically storing solid-liquid slurries without agitation.

These and other objects are preferably accomplished by providing agitation means at the bottom of a stationary tank for agitating solid components of the solid-liquid slurry which settle to the bottom of the tank. The liquid components of the slurry settle on the top of the solid components and are withdrawn from the tank while a relatively solids-free liquid is introduced into contact with the agitation means so as to fluidize any solid components of the slurry surrounding the agitation means. The agitation means is actuated to agitate the solid components at the bottom of the tank and the slurry is withdrawn while the solid components are in suspension.

Preferably, the agitation means comprises a motor-driven auger extending across the bottom of the housing.

BRIEF DESCRIPTION OF THE DRAWING

The drawing is a vertical sectional view, partly schematic, of a preferred arrangement for storing a solid-liquid slurry in accordance with the teaching of the present invention.

DESCRIPTION OF THE PREFERRED EMBODIMENT

Referring to the drawing, a stationary storage tank 10 is shown for storing therein a slurry having solid and liquid components. The tank 10 preferably includes a top closure wall 11, a domed top wall 11a, a bottom wall 12, and a cylindrical sidewall 13. Of course, tank 10 may take other suitable shapes, if desired. A mixing chamber 14 is provided at the bottom of tank 10 in communication with the interior of tank 10.

Solid components-agitation means, in the preferably form of a helical auger 15, extends across substantially the bottom of tank 10 and into chamber 14. Auger 15 is preferably driven by suitable motive means, as for example a variable-speed motor 16. A plurality of sparger inlet lines 17 are in communication with the bottom wall 12 of tank 10 so that liquids may be introduced into tank 10 at a plurality of spaced locations along auger 15 as will be discussed further hereinbelow. Lines 17 are preferably controlled by suitable normally open valves 18. A floating liquid suction line 19 is preferably pivotally attached at one end to sidewall 13, as for example through a conventional fluidtight swivel coupling 20, and includes a liquid inlet portion 21 at its other end which is adapted to extend down into communication with the liquid components of the slurry in tank 10. A float 22 is preferably coupled to suction line 19 adjacent inlet portion 21 in such a manner that, when float 22 rests on the surface 23 of liquid in tank 10, inlet portion 21 extends down into the liquid for an appreciable distance, all as illustrated in the drawing. Of course, alternatively, line 19 may be so arranged that it is suspended above surface 23 so that it takes suction close thereto.

A line portion 24 is coupled in fluidtight engagement to coupling 20 and is in turn coupled to both a mixing chamber inlet portion 25, controlled by a normally closed valve 26, and to a suction bypass line portion 27 which is in turn coupled to the inlet of a conventional pump 28.

A slurry discharge outlet 29 is in communication with both the interior of mixing chamber 14 for removing slurry therefrom and to suction bypass line portion 27. Suction bypass line portion 27 is controlled by a normally open valve 30 while slurry discharge outlet 29 is controlled by a normally closed valve 31. A liquid inlet and outlet bypass line portion 32 is in communication with mixing chamber 14. Line portion 32 also communicates with the outlet of pump 28 through a pump line portion 33 and is controlled by a normally closed valve 34 located between line portion 33 and a discharge area (not shown). A normally open valve 35 is disposed in line portion 32 between mixing chamber 14 and line portion 33.

A sparging line portion 36, controlled by a normally open valve 37, is coupled to both the outlet of pump 28 and to sparging line 38. Sparging line 38 is in turn coupled to the sparger inlet lines 17 for introducing liquid into tank 10.

As illustrated in the drawing, in operation, the solid-liquid slurry is flowed into tank 10 from any appropriate external source (not shown) and allowed to stand until the liquid and solid components settle as illustrated. The liquid components of the slurry thus rise to the top of tank 10 (i.e., about the settled solid components bed). Float 22 settles on the surface 23 of the liquid components and suction inlet portion 21 extends down into the liquid components. Suction line 19 pivots about coupling 20 to compensate for the level of the slurry in tank 10. At this time, the motor 16 and the pump 28 are inactive and valves 18, 30, 35 and 37 are open; valves 26, 31 and 34 are closed. Pump 28 is activated and suction from pump 28 draws the liquid components in tank 10 up suction inlet portion 21, through coupling 24, past valve 30 and into pump 28. The relatively solids-free liquid components are thus pumped from pump 28, through pump line portion 33, into line portion 32, past valve 35 and into mixing chamber 14. The liquid components are also pumped from pump 28, through valve 37 in sparging line portion 36 and into sparging line 38. From sparging line 38, the liquid components flow through sparging line inlet lines 17 and valves 18 into communication with auger 15. This fluidizes any solids components surrounding the auger 15 and permits auger 15 to rotate freely.

Motor 16 is then activated, the speed thereof being variable as desired for the conditions involved, and, once auger 15 is running free, valves 35, 18, 30 and 37 are closed. Valves 26, 31 and 34 are opened and the liquid components are then drawn through suction line portion 24, mixing chamber inlet portion 25 and valve 26 and into mixing chamber 14. Here, the liquid and solids components are mixed at the end of the auger 15 in chamber 14. With valves 31 and 34 open, the slurry may be flowed through slurry discharge outlet 29 and bypass line portion 32, respectively, to the discharge area.

In this manner, large amounts of power are not required to withdraw solid-liquid slurries from storage tanks while keeping the solids in the slurries in suspension. The slurries of this invention are only mixed when it is desired to pump them out of the storage tanks to a discharge area. The techniques of the present invention may be used on any suitable solid-liquid slurry, as for example dry solids such as grains, minerals, etc., all suspended in suitable fluids.

I claim as my invention:

1. A storage tank for selectively storing therein and withdrawing therefrom a slurry having solid and liquid components, said tank comprising:

a stationary housing adapted to contain said slurry therein, whereby the solid components of said slurry are adapted to settle on the bottom of said housing while the liquid components of said slurry are adapted to rise above said solid components;

solid-components-agitation means positioned in said housing and extending along substantially the bottom of said housing so as to contact solid components of said slurry which settle on the bottom of said housing;

liquid-components-suction means operatively engaging said housing having a first normally open portion thereof disposed substantially adjacent to the top of said liquid components in said housing so as to take suction from the top of said liquid components;

relatively solids-free normally open liquid inlet means disposed in said housing and in communication with said solid-components-agitation means for introducing relatively solids-free liquid into contact with said agitation means so as to fluidize any solid components of said slurry surrounding said agitation means;

normally closed slurry discharge outlet means operatively positioned adjacent the bottom of said housing for withdrawing said slurry therefrom; and pumping means operatively engaging all of said suction means, said liquid inlet means and said slurry discharge outlet means, the inlet of said pumping means engaging both said suction means and said slurry discharge outlet means and the outlet of said pumping means engaging said liquid inlet means.

2. The tank of claim 1 wherein said agitation means comprises a helical auger extending substantially horizontally along the bottom of said housing; and motive means coupled to said auger for rotating said auger.

3. The tank of claim 2 wherein said motive means comprises a variable-speed motor.

4. The tank of claim 2 wherein said liquid inlet means includes a plurality of sparger inlets communicating with said auger at a plurality of spaced locations along the longitudinal axis thereof.

5. The tank of claim 1 wherein said suction means includes a float adapted to float on the surface of said liquid components in said housing and a liquid suction line coupled to both said float and said pumping means and having an inlet portion extending down into the liquid components in said housing.

6. The tank of claim 1 wherein the bottom of said housing includes a mixing chamber, said suction means includes a second normally closed portion in selective communication with said mixing chamber, and said agitation means extends into said mixing chamber and both said liquid inlet means and said slurry outlet means operatively engage said housing through said mixing chamber.

7. The tank of claim 1 wherein said liquid inlet means includes a normally closed valve means for selectively withdrawing said slurry from said tank.

8. A method for selectively withdrawing and storing a slurry having solid and liquid components in a stationary housing whereby solid-components-agitation means is disposed at substantially the bottom of said housing for agitating the solid components of said slurry which settle to the bottom of said housing, said method comprising the steps of:

introducing said slurry into said housing whereby the solid components of said slurry settle on the bottom of said housing and the liquid components of said slurry rise to the top of said solid components;

withdrawing said liquid components from the surface of said liquid components in said housing while introducing relatively solids-free liquid into contact with the agitation means at the bottom of said housing so as to fluidize any solid components of said slurry surrounding said agitation means;

actuating said agitation means so as to agitate the solid components disposed on the bottom of said housing, thereby suspending the solid components in said liquid components; and withdrawing said slurry from the bottom of said housing while said solid components are in suspension.